S. T. McLELLAN.
RIM EXPANDER AND CONTRACTOR.
APPLICATION FILED JAN. 2, 1919.
1,435,867.
Patented Nov. 14, 1922.
2 SHEETS—SHEET 1.
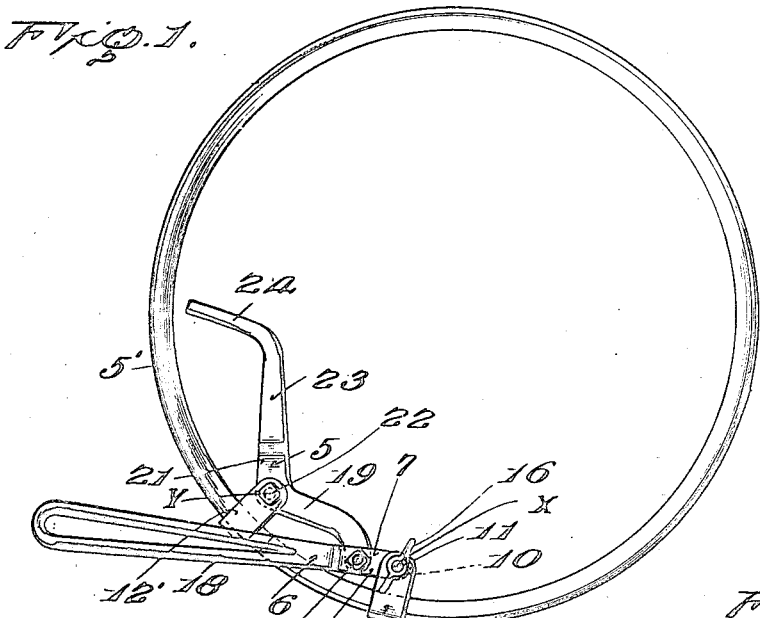
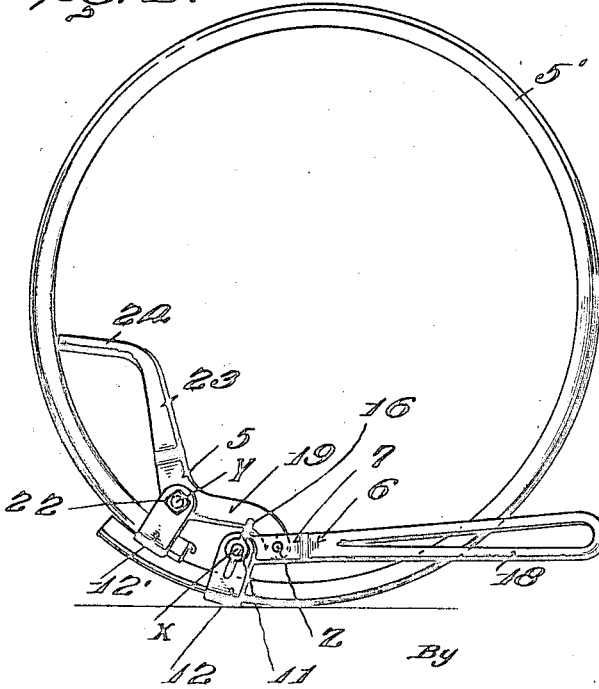
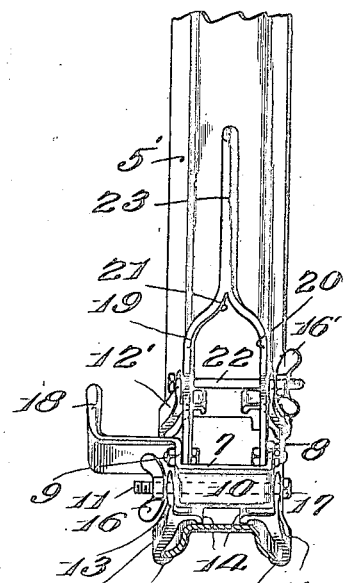
Inventor
S. T. McLellan

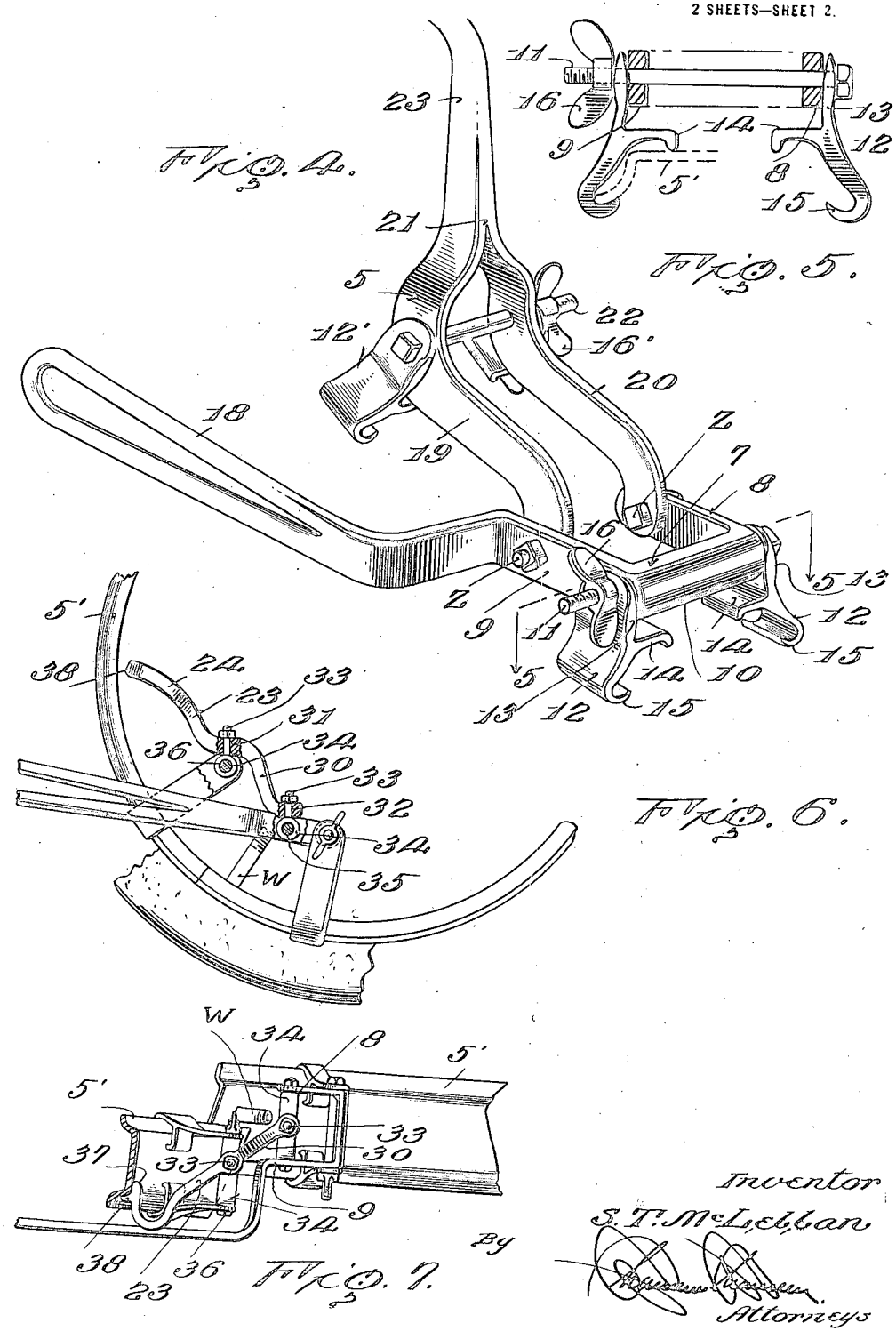

Patented Nov. 14, 1922.

1,435,867

UNITED STATES PATENT OFFICE.

SAMUEL T. McLELLAN, OF CHARLESTON, WEST VIRGINIA, ASSIGNOR TO THOMAS E. PERRY, OF CHARLESTON, WEST VIRGINIA.

RIM EXPANDER AND CONTRACTOR.

Application filed January 2, 1919. Serial No. 269,370.

*To all whom it may concern:*

Be it known that I, SAMUEL T. McLELLAN, a citizen of United States, residing at Charleston, in the county of Kanawha, State of West Virginia, have invented certain new and useful Improvements in Rim Expanders and Contractors; and I do hereby declare the following to be a full, clear, and exact description of the invention, such as will enable others skilled in the art to which it appertains to make and use the same.

This invention is a device designed to facilitate the application of tire casings to split rims and their removal therefrom. It has for its object to provide a device, applicable to a split rim and operable first to separate the ends of the rim slightly to release the locking lug thereof, and then to contract the rim, drawing one of its ends inwardly and in overlapping relation to the other end, so as, in effect, to reduce the circumference of the rim, thus making easy the application of a casing thereto, or its removal therefrom.

It is well known that the greatest difficulty experienced with rims of this type is the separation of the rim ends either initially to release the locking lug, in the removal of the casing, or finally, so that the lug may be engaged, in the application of the casing. Even in rims which do not employ locking lugs, the final operation in the application of the casing—the movement of the rim ends to alinement—is ordinarily difficult, since the casing itself presents resistance to this operation; and it is an object of the present invention, therefore, to provide a structure by which the rim ends may be not only initially separated in the removal of the casing, but by which also, the rim ends may be finally moved outwardly of each other in the application of a casing either complete operation of contracting or expanding the rim being accomplished through a single continuous movement of an operating lever.

An especial object of the present invention, furthermore is to provide a structure such as is set forth in the foregoing, by means of which a rim may be contracted for the removal of a tire or expanded with a tire thereupon, without the necessity for introducing a screw driver or any other tool into the joint at the ends of the rim.

Other objects are to provide a device which may be readily applied to a rim, and which may be easily operated.

Other objects will be seen from the following description.

In the drawings:—

Fig. 1 is a side elevation of the present invention applied to a rim, the latter being shown in normal position.

Fig. 2 is a similar view, showing the rim contracted for the removal or application of a casing.

Fig. 3 is a section through the rim, showing the device in end elevation, with the parts in the position as shown in Fig. 1.

Fig. 4 is a perspective view of the complete device.

Fig. 5 is a detail section on line 5—5 of Fig. 4, with the grips and bolt in elevation, and with the grips engaged with a rim.

Fig. 6 is a side elevation of a modified form designed for use in connection with rims in which the valve stem opening is located near the split.

Fig. 7 is a top plan of the modified form, with the rim contracted.

Referring now to the drawings, there is shown a split rim 5', to which the present invention is applied. The device itself includes two pivotally connected portions 5 and 6, the latter including a yoke 7 having arms 8 and 9 and a connecting bight 10. Adjacent to the bight, a bolt 11 is passed through the arms, and engaged with this bolt outwardly of the arms there is a pair of rim engaging jaws 12. These jaws have stem portions 13 through which the bolt 11 passes and which carry lips 14 and 15, the former extending approximately at right angles inwardly from the stems, while the latter are inclined outwardly, to conform to the usual slant of the rim flange, and both lips have their terminal edges turned inwardly, the edge of the lip 14 being adapted to engage against the inner circumferential face of the rim, while the edge of the lip 15 is adapted to engage over the free edge of the rim flange, as shown. The stems 13 are slightly curved, as shown, so that when they are forced inwardly, the jaws will be rocked with the result that the edges of the lips 14 will be forced against the rim, while the edges of the lips 15 will be engaged firmly against the rim flanges.

For the purpose of forcing the jaws into engagement with the rim and securely clamping the latter there-between, as just described, a wing nut 16 is engaged with one end of the bolt 11 and impinges against one of the jaw stems, while the head of the bolt, indicated at 17, impinges against the other jaw stem.

Carried by the free end of the arm 9 of the yoke, there is an operating lever 18, shown in the drawings as formed integrally with the arm, and this lever is offset outwardly from the arm into a longitudinal plane parallel with the longitudinal plane of the arm.

The portion 5 of the device also includes a yoke having arms 19 and 20 and a connecting bight 21, and the ends of these arms distant from the bight are pivoted to the arms 8 and 9 of the yoke 7 at points adjacent to the ends of these arms which are distant from the bight 10.

A bolt 22 is engaged through the arms 19 and 20 adjacent to their connected ends, and with the ends of this bolt there are engaged the stems of jaws 12' identical with the jaws 12, a clamping nut 16' being engaged with this bolt, as shown.

At the opposite side of the bolt 22 from their pivoted ends, the extremities of the arms 19 and 20 are turned laterally, and formed integrally with the bight 21, there is an arm 23 which extends in a direction coincident with the laterally turned extremities of the arms 19 and 20, this arm 23 having its end portion turned at an angle to from a finger 24, extending oppositely from the major portions of the arms 19 and 20, as shown.

From the foregoing, it will be seen that with the jaws 12 fixed, the lever 18 may be moved to shift the yoke 7 upon the pivotal connections with the jaws, and that by this operation the point of pivotal connection between the two pairs of yoke arms, indicated at Z, may be shifted from side to side of the center of pivotal movement of the yoke 7, indicated at X.

For convenience in describing the operation of the device, the centers of pivotal movement of the parts are indicated by reference characters. The center represented by the bolt 11 is indicated at X; the center represented by the bolt 22, at Y; and the center represented by the point of pivotal connection between the pairs of yoke arms, at Z.

In use, the pairs of jaws 12 and 12' are engaged with the rim at opposite sides of its split, and the lever 18 is positioned so as to bring the center Z between the centers X and Y, and also into a plane between the rim and the common plane occupied by the centers X and Y. With the device so positioned, the finger 24 of the arm 23 extends toward the rim, but lies with its free extremity spaced therefrom; and the lever 18, by reason of its offset, lies at the side of the rim and extends outwardly beyond the outer peripheral face thereof.

If, now, the lever 18 be shifted to move the center Z toward the plane of the centers X and Y, these two centers will be forced apart, and the ends of the rim will be slightly separated; and at the same time, the arms 19 and 20 will be rocked upon the center Y and the free extremity of the finger 24 will be brought into engagement with the rim. This engagement of the finger with the rim will prevent further pivotal movement of the arms 19 and 20 on the center Y, so that, during continued movement of the lever 18, the finger 24 engaging the rim acts as a fulcrum, and that portion of the rim with which the jaws 12' are engaged is moved inwardly of the other end portion of the rim, diametrically of the rim. Then, as the center Z passes to the opposite side of the center X, the pairs of jaws are drawn toward each other and the parts are brought into the position shown in Fig. 2, with the ends of the rim in overlapping relation and with the rim contracted. A casing upon the rim may be then easily removed.

When a casing is replaced, the parts are, of course, in the position shown in Fig. 2. The casing is placed upon the rim, and the lever 18 is reversely moved to permit the rim to expand. By reason of the resistance presented by the casing, however, the rim will not ordinarily expand sufficiently to permit the free ends thereof to pass and move into alinement, and it is in overcoming this difficulty that the present device is especially efficient.

When the expansion of the rim is halted by the casing, it is only necessary to move the lever 18 so as to shift the center Z toward the rim to a point between the centers X and Y, when these two centers will be separated and the ends of the rim forced into planes spaced circumferentially of the rim, the rim end adjacent to the jaws 12' being held inwardly of the other rim end by engagement of the finger 24 with the rim. Further movement of the center Z toward the rim shifts the finger 24 away from the rim and the two rim ends come together in perfect alignment, so that they may be easily brought into alinement.

Attention is directed to the fact that the provision of the finger 24 which engages the rim and arrests pivotal movement of the arms 19 and 20 on the center Y is important to the operation of the device, since, were this structure not included, there would be no action shifting one end of the rim out of alinement with the other, thus making it possible to contract the rim.

Attention is also directed to the fact that the clamping action of the jaws against the rim results from the fact that they are rocked individually as they are moved inwardly by the action of the nuts 16 and 16′ upon the bolts 11 and 22, so that they may be engaged with the rim tightly, without a sufficient clamping action of the nuts 16 and 16′ to interfere with free pivotal movement of the working parts.

The modified form of the invention is especially designed for use in connection with rims in which the valve stem opening is located close to the split, in which event, of course, the valve stem would interfere with the contraction of the rim. The modified form of the device has therefore been designed so as to make it possible to shift the rim ends laterally with respect to each other, in order that the rim end which is moved inwardly may pass the valve stem.

In the modification, the portion 6 of the device is identical with this portion in the first described form. The portion 5 includes an arm in which there are formed spaced openings 31 and 32, and these openings have pivot pins 33 engaged therein, these pins being carried by sleeves 34, from which they extend laterally. Through one of these sleeves, there is passed a bolt 35 which is also engaged pivotally in the arms 8 and 9 adjacent to the disconnected ends of these arms, thus forming the center Z. The other sleeve, 34, has a bolt 36 passed therethrough, on which grips 12′ are engaged, thus forming the center Y. The arm 30 is extended beyond its opening 31 at the opposite side thereof from the opening 32, thus forming the arm 23, provided at its free extremity with the finger 24. In this form of the structure, the finger 24 has its free end portion turned laterally, as indicated at 37, and it is also provided with a lug 38 at the base of this lateral portion in alinement with the finger.

The operation of the structure is the same as in the first described form up to the point at which the lug 38 engages the rim. When this has occured, the arm 23 is grasped and drawn laterally at its free end, which will bring the lug 38 to one side of the rim and permit its engagement against the rim flange. This lateral movement of the arm 23 will cause the end portions of the rim to shift laterally with respect to each other, as shown in Fig. 7, and permit the rim end which is drawn inwardly to pass the valve stem, indicated at W, the engagement of the lug 38 with the rim flange holding the rim ends laterally out of alinement, as will be understood, while the laterally turned portion 37 of the finger 23 engages against the rim to hold the arm 30 against pivotal movement with respect to the grips 12′.

The present invention, in both its embodiments, has been of special service in applying casings which have been retreaded, since the operation of retreading has a tendency to shrink the casing, frequently rendering it impossible to bring the rim ends into final alined position by ordinary methods. As has already been stated, the final operation of the present structure in the application of a casing, is to expand the rim circumferentially, thus separating the rim ends and making easy their final alinement.

What is claimed is:—

1. A rim expander and contractor comprising a plurality of sets of rim gripping means, a lever pivotally connected to one set of gripping means, and a second lever pivotally connected with the other gripping means and with the first lever for pivotal movement in planes at right angles to each other.

2. A rim expander and contractor comprising a plurality of sets of rim gripping means, a lever pivotally connected with one set of gripping means, a member mounted on the other gripping means and a similar member mounted on the lever for pivotal movement in the same direction as that of the lever, and a second lever pivotally connected to both of said members for pivotal movement in a plane at right angles to the plane of movement of the members and the first gripping means and second gripping means.

In testimony whereof, I affix my signature in the presence of two witnesses.

S. T. McLELLAN.

Witnesses:
A. D. SCHOONOVER,
McH. EHMAN.